(12) United States Patent
Figus (10) Patent No.: US 8,935,218 B2
(45) Date of Patent: Jan. 13, 2015

(54) MULTI-CLIENT GENERIC PERSISTENCE FOR EXTENSION NODES

(75) Inventor: Daniel Figus, Wallduern (DE)

(73) Assignee: SAP SE, Walldorf (DE)

( * ) Notice: Subject to any disclaimer, the term of this patent is extended or adjusted under 35 U.S.C. 154(b) by 250 days.

(21) Appl. No.: 13/288,976

(22) Filed: Nov. 4, 2011

(65) Prior Publication Data

US 2013/0117346 A1   May 9, 2013

(51) Int. Cl.
*G06F 17/30* (2006.01)
*G06Q 10/10* (2012.01)

(52) U.S. Cl.
CPC .... *G06F 17/30557* (2013.01); *G06F 17/30297* (2013.01); *G06Q 10/10* (2013.01)
USPC ........... 707/687; 707/705; 707/790; 707/813; 707/821; 707/608

(58) Field of Classification Search
CPC ................................................ G06F 17/30902
USPC .................. 707/608, 687, 705, 790, 813, 821
See application file for complete search history.

(56) References Cited

U.S. PATENT DOCUMENTS

| | | | |
|---|---|---|---|
| 2003/0093755 A1* | 5/2003 | O'Carroll | 715/500 |
| 2006/0101091 A1* | 5/2006 | Carbajales et al. | 707/202 |
| 2009/0063500 A1* | 3/2009 | Zhai et al. | 707/10 |
| 2009/0112908 A1 | 4/2009 | Wintel et al. | |
| 2010/0161648 A1* | 6/2010 | Eberlein et al. | 707/769 |
| 2011/0145194 A1 | 6/2011 | Figus et al. | |
| 2011/0153576 A1 | 6/2011 | Figus | |
| 2011/0154253 A1 | 6/2011 | Lehr et al. | |

OTHER PUBLICATIONS

Chau Hock-Chuan; A Quick-Start Tutorial on Relational Database Design; Sep. 2010; p. 1-7; Nanyang Technological University; Singapore; http://www.ntu.edu.sg/home/ehchua/programming/sql/Relational_Database_Design.html.

* cited by examiner

*Primary Examiner* — Sana Al Hashemi (57) ABSTRACT

Various embodiments of systems and methods to provide multi-client generic persistence for extension nodes are described herein. A standard field value and an extension field value specific to a client of a business data object are separated. Further, an extension node instance key associated with the extension field value is segregated. Furthermore, the standard field value and associated standard node instance key are stored in a standard persistence unit, and the extension field value is stored in an extension data persistence unit. Also, the extension node instance key and a relation between the standard node instance key and the extension node instance key are stored in an extension key persistence unit.

18 Claims, 10 Drawing Sheets

MULTI-CLIENT GENERIC PERSISTENCE FOR EXTENSION NODES

FIELD

Embodiments generally relate to computer systems and more particularly to methods and systems to provide multi-client generic persistence for extension nodes.

BACKGROUND

Software as a service (SaaS) solution provides the functional depth of a large scale business management solution, which can include applications, standard data objects, databases and the like. To enable customization of the solutions for a client, it can be possible to add one or more extension fields (e.g., client defined business data fields added to standard business objects) to support individual business processes.

Currently, it may be possible to add extension fields under an extension node associated with a business object (e.g., a new extension field can be added for a business data object). However, the SaaS can be hosted on a multi-client system, where multiple clients or users or customers are located on a same computer system. In such a scenario, isolation of extension field values specific to the client and retrieving the business data object specific to the client at a faster pace are important objectives. Further, the extension fields can store not only one value, but they can store multiple values. However, there are no methods to define the extension fields carrying multiple values. If the extension fields carrying multiple values are defined, then the optimization of the resources can be achieved as creating multiple extension fields can be avoided.

Therefore, it is desirable to provide a method and system to provide multi-client generic persistence for extension nodes to support isolation of extension field values specific to the client, to retrieve the business data object specific to the client at the faster pace, and achieve resource optimization.

SUMMARY

Various embodiments of systems and methods to provide multi-client generic persistence for extension nodes are described herein. In one aspect, a standard field value and an extension field value specific to a client of a business data object are separated. Further, an extension node instance key associated with the extension field value is segregated. Furthermore, the standard field value and associated standard node instance key are stored in a standard data persistence unit, and the extension field value is stored in an extension data persistence unit. Therefore, by storing the standard field value and the extension field value separately, isolation of extension field values specific to the client can be achieved.

Further, the extension node instance key and a relation between the standard node instance key and the extension node instance key are stored in an extension key persistence unit. Therefore, by storing the extension node instance key and the relation with the standard node instance key separately, it is possible to define the extension node specific to the client in a multi-client system. Thus, semantically grouping extension fields together and defining extension fields which can carry multiple values can be achieved. Also, retrieving the business data object specific to the client at a faster pace and resource optimization can be achieved.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques to provide multi-client generic persistence for extension nodes are described herein. A client is provided with an option to customize the standard data objects to modify operation of a networked application. The customized data or a business data object can be stored in a business object specific to the networked application. The business object can include one or more standard nodes and corresponding one or more extension nodes. Further, the standard nodes and the extension nodes can include corresponding one or more standard fields and extension fields respectively to store the business data object. The business data object can include standard field values (e.g., stored in the standard fields) and extension field values (e.g., stored in the extension fields) specific to the client. In one embodiment, a business data storage unit is provided to store business data objects associated with multiple clients.

According to one embodiment, the standard field values and the extension field values specific to the client are separated from the business data object. Further, the extension field value and an extension node instance key associated with the extension field value are stored in separate persistence units. Furthermore, a relation between a standard field instance key associated with the standard field values and the extension node instance key are stored. Since the values (e.g., standard field values and user-specific extension field values), the keys (e.g., extension node instance key) and the relation between them are stored separately, it is possible to define existence of the extension node specific to the client in a multi-client system. Therefore, it can be possible to semantically group the extension fields' specific to the business process, which are associated with the client and achieve resource optimization. Also, it can be possible to provide fast navigation to the extension field values.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
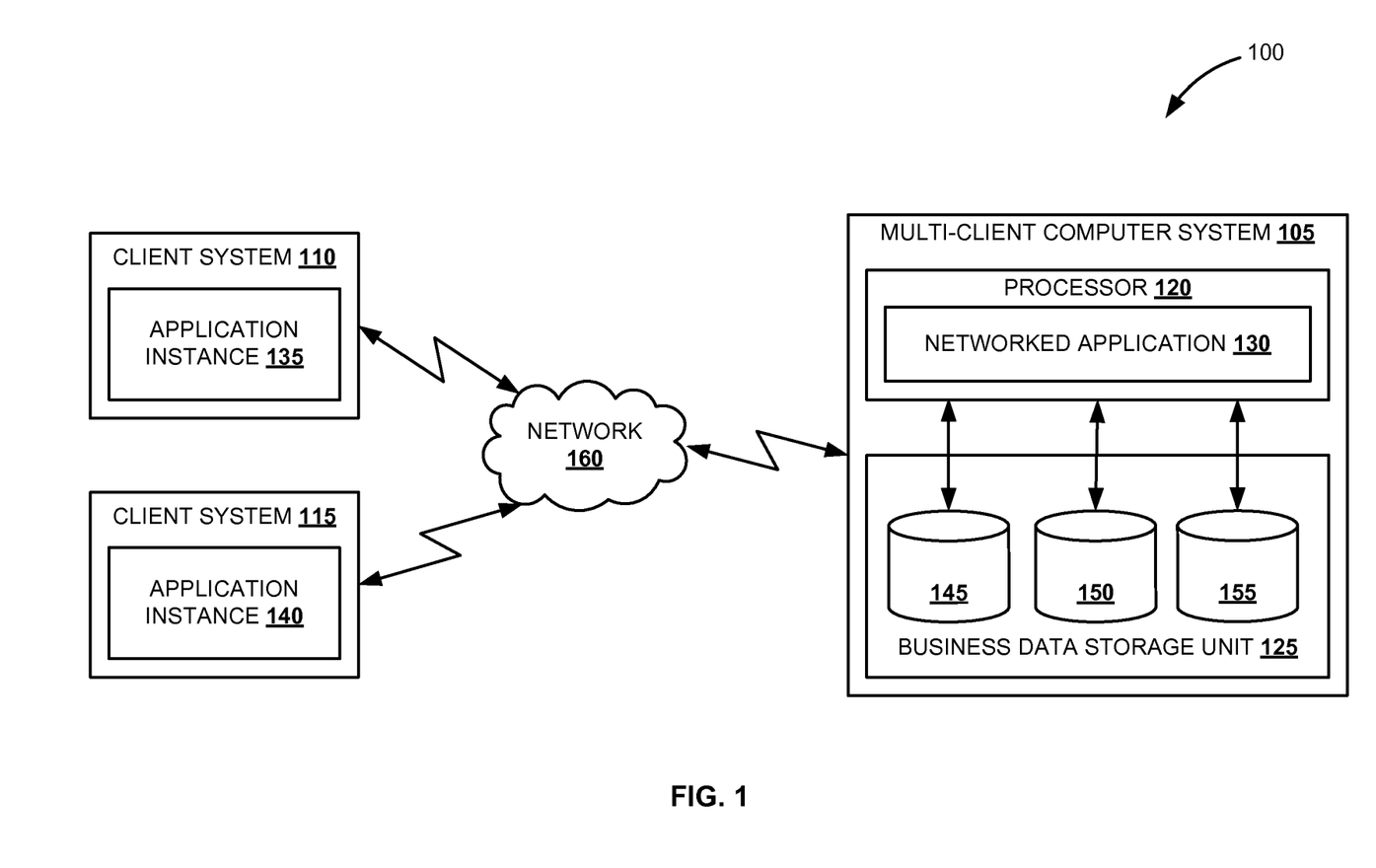
FIG. 1 is a block diagram illustrating the architecture for providing multi-client generic persistence for extension nodes, according to an embodiment.

FIG. 1 is a block diagram illustrating the architecture for providing multi-client generic persistence for extension nodes, according to an embodiment. A system 100 includes a multi-client computer system 105 communicative with one or more client systems (e.g., 110 and 115) over a network 160. The multi-client computer system 105 may be desktop computers, work stations, laptop computers, hand held computers, smart phone, console devices, and the like. The network 160 may be wired, wireless, or a combination thereof. Examples of the network 160 may include, but are not limited to the Internet, an intranet, a wide or local area network, and the like.

The multi-client computer system 105 may include one or more processors (e.g., 120) and one or more memory devices or data persistence devices or business data storage units (e.g., 125). The business data storage unit 125 provides access to a networked application 130 being executed in the processor 120. In one exemplary embodiment, access to the networked application 130 is provided for a plurality of clients whose data should be kept isolated. The networked application 130 may be available for execution using application instances (e.g., 135 and 140) presented to clients, who connect from the client systems (e.g., 110 and 115). The client may be an entity, person, a system, an application and the like that accesses the networked application 130 at the multi-client computer system 105. In one embodiment, the business data storage unit 125 includes a standard data persistence unit 145, an extension key persistence unit 150 and an extension data persistence unit 155 to provide multi-client generic persistence for extension nodes in the multi-client computer system 105.

In operation, the user or client operating the client system 110 can add customizations to standard features and standard data objects (e.g., a business data object) provided by the networked application 130 via the application instance 135. The business data object can include a standard field value and an extension field value specific to the client. The standard field value corresponds to one or more standard fields of a standard data object defined by the networked application 130 and the extension field value corresponds to one or more extension fields to modify operation of the networked application 130 for the client. For example, consider that the networked application 130 provides sales order functionality. The standard field value of the business data object can include business object name (e.g., sales order), the business object node (e.g., header) and a node identifier (e.g., 1000). The extension field value can include client specific data fields (e.g., value1_1).

In one embodiment, the business data object is stored in the business data storage unit 125. The standard field value and associated standard node instance key are stored in the standard data persistence unit 145. The standard node instance key defines a number of extension nodes associated with the standard node. Further, the extension field value is stored in the extension data persistence unit 155. An extension node is created specific to the client and the extension field value is stored in an extension field of the extension node. In one exemplary embodiment, the client can define one or more extension nodes to store extension field values specific to a business process.

In one embodiment, an extension node instance key associated with the extension field value, and a relation between the standard node instance key and the extension node instance key are stored in the extension key persistence unit 150. Further, when an additional business data object associated with the business data object is received, an extension field value associated with the additional business data object is stored in the corresponding extension fields. The storing of the extension field value associated with the additional business data object is achieved using the relation between the standard node instance key and the extension node instance key that are stored in the extension key persistence unit 150. Therefore, creating extension nodes for every business data object may not be required. Further, it is possible to semantically group the extension fields' specific to the business process, which are associated with the client. Also, it is possible to define the extension fields carrying multiple values through the relation between the standard node instance key and the extension node instance key. Similarly, a business data object specific to the client operating the client system 115 can be received and stored. Therefore, the business data objects related to the client systems (e.g., 110 and 115) are stored in the single business data storage unit 125. However, as the standard field value and the extension field value are stored separately, isolation of extension field values specific to the client (e.g., client system 110 and client system 115) can be achieved. Storing the business data object specific to the client is described in greater detail in FIGS. 2 and 3.

Figure 2:
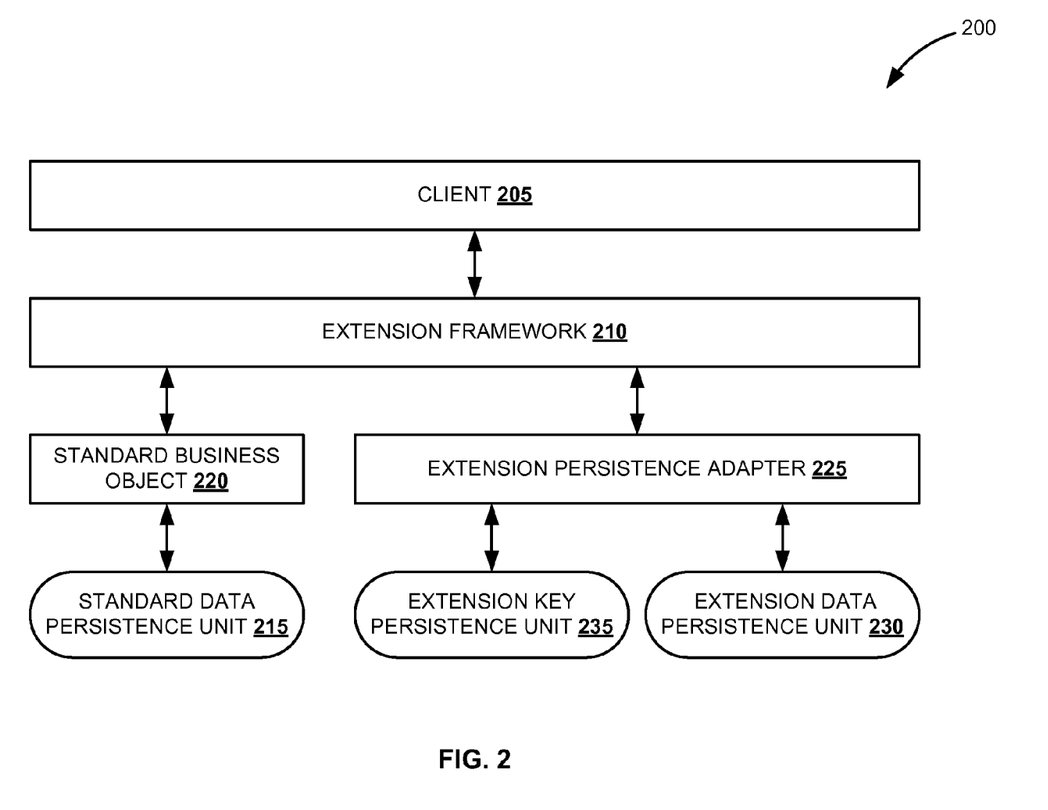
FIG. 2 is a block diagram illustrating a system to provide multi-client generic persistence for extension nodes, according to an embodiment.

FIG. 2 is a block diagram 200 illustrating storing of a business data object specific to a client in a multi-client computer system, according to an embodiment. During runtime, a business data object customized by the client 205 is received. An extension framework 210 splits the business data object into a standard field value and an extension field value. The extension field value is specific to the client 205. In one exemplary embodiment, the extension framework 210 can be implemented at the multi-client computer system at a client machine or at an intermediate processing system between the multi-client computer system and the client machine. Further, the standard field value and associated standard field instance keys are stored in a standard data persistence unit 215 communicative with a standard business object 220.

In one embodiment, the extension framework 210 segregates an extension node instance key associated with the extension field value. Further, the extension field value is converted into a database format having a specific structure at an extension persistence adapter 225. The converted extension field value is stored in an extension data persistence unit 230. The extension data persistence unit 230 can be formatted as a simple database table whose structure may not be specific to the client 205 as extension field values of multiple clients are stored in the extension data persistence unit 230. In one example, the extension data persistence unit 230 can be formatted as a list table with the extension field value specific to the client 205 is stored in a row.

In one embodiment, the extension node instance key and a relation between the standard node instance key and the extension node instance key are stored in an extension key persistence unit 235. In one embodiment, the extension node instance key includes an extension node key, a parent node key and a root node key as a reference to the one of the plurality of clients, the standard data object and an instance of the standard data object with which the extension field value is associated. The extension node instance key is described in greater detail in FIG. 4. Storing of the business data object is described with an example in FIG. 3.

Figure 3:
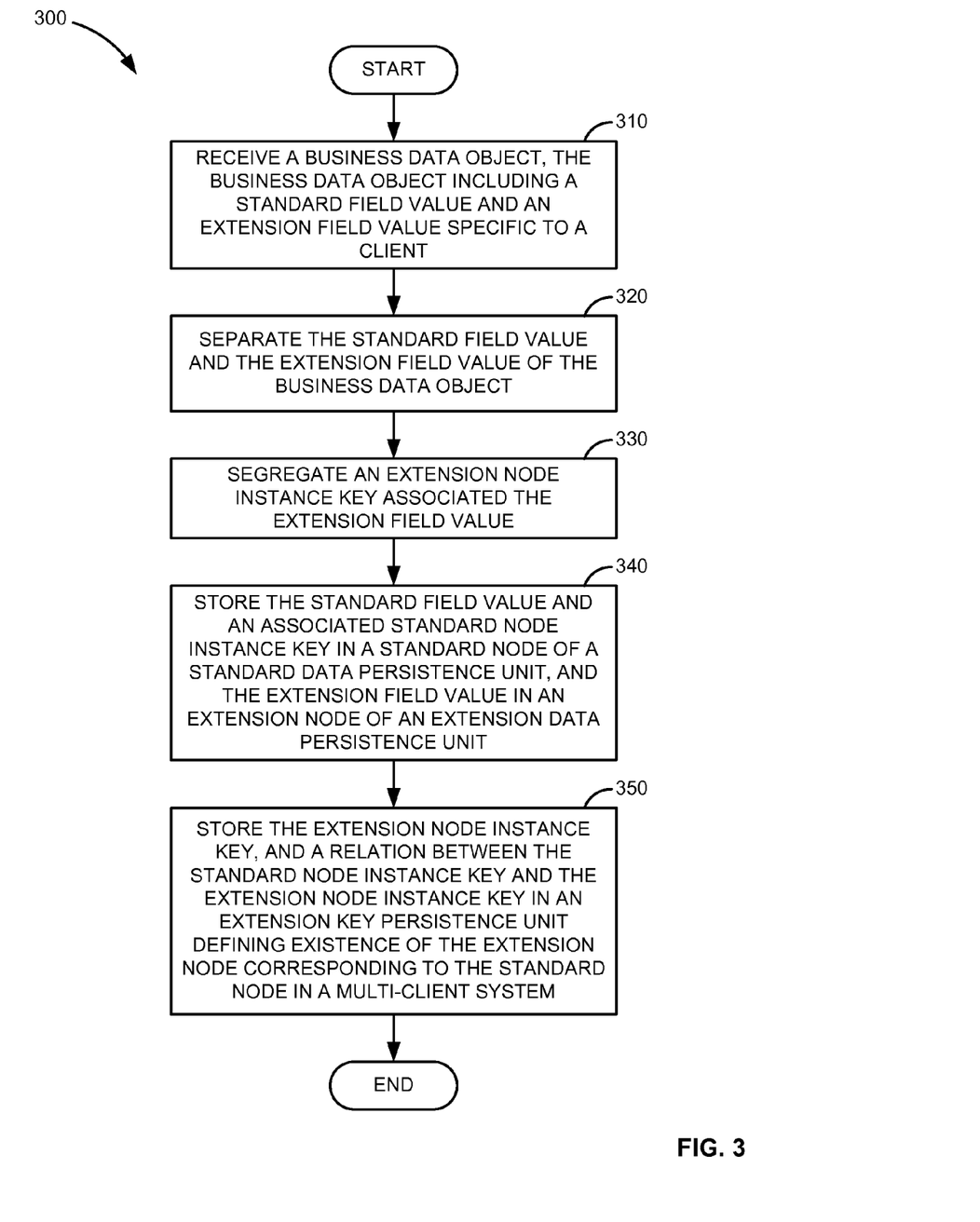
FIG. 3 is a flow diagram illustrating a method to provide multi-client generic persistence for extension nodes, according to an embodiment.

FIG. 3 is a flow diagram 300 illustrating a method to provide multi-client generic persistence for extension nodes, according to an embodiment. At step 310, a business data object, including a standard field value and an extension field value specific to a client, is received. For example, the business data object can be personal information specifying hobbies of the client. In one embodiment, the business data object can include a standard field value and an extension field value specific to the client. The standard field value (e.g., personal information ID) corresponds to one or more standard fields of a standard data object defined by a networked application and the extension field value (e.g., hobbies like cricket, reading, gardening and knitting) corresponds to one or more user-specific extension fields to modify operation of the networked application corresponding to the client. The business data object is described in greater detail in FIG. 4.

At step 320, the standard field value and the extension field value of the business data object are separated. For example, the personal information ID and the list of hobbies are separated. At step 330, an extension node instance key associated with the extension field value is segregated from the extension field value. For example, the extension node instance key includes an extension node key (e.g., extension node ID hobbies_100), the parent key (e.g., a relation between a standard node and an extension node) and the root key (e.g., a root node ID header of the personal information).

At step 340, the standard field value and associated standard node instance key are stored in a standard data persistence unit. The standard node instance key defines a number of instances of extension nodes associated with a standard node corresponding to the standard field value. For example, if only 'hobbies' are stored as personal information, the standard node instance key indicates there is only one extension node (e.g., hobbies) associated with the standard node (e.g., personal information). Further, if other information such as date of birth is stored, the standard node instance key indicates there are two extension nodes (e.g., hobbies and date of birth) associated with the standard node (e.g., personal information).

Further, the extension field value is stored in an extension data persistence unit. For example, the list of hobbies is stored in an extension data field. In one exemplary embodiment, the extension field value is converted into a database format having a specific structure before storing in the extension data persistence unit. The structure of the extension data persistence unit used to store the extension field value may not be specific to the client as extension field values associated with multiple clients are stored in the extension data persistence unit. In one example, the extension field value can be converted to fit to a format of a table for easy and fast access of the extension field value specific to the client.

At step 350, the extension node instance key, and a relation between the standard node instance key and the extension node instance key are stored in an extension key persistence unit. In one embodiment, the extension node instance key includes an extension node key, a parent node key and a root node key. The extension node key includes an extension node ID (e.g., hobbies_100), the parent node key includes a parent node ID to define a relation between a standard node and an extension node (e.g., relation between the personal information and the hobbies), and the root node key includes a root node ID (e.g., header of personal information). The extension node key, the parent node key and the root node key stored in the extension key persistence unit are used to retrieve or read or navigate the extension field value at a faster pace. Retrieving of the extension field value is explained in greater detail in FIG. 6.

In one embodiment, the parent node key defines the relation between the standard node and the extension node by defining extension fields carrying multiple values. For example, the extension field hobbies may include multiple values such as cricket, reading, gardening and knitting. The parent key of the extension field hobbies includes multiplicity 'one-to-many', indicating the extension field hobbies include multiple values. Similarly, the extension field 'date of birth' includes one value. Thereby, the parent key of the extension field date of birth includes multiplicity 'one-to-one', indicating the extension field 'date of birth' includes one value. The multiplicity 'one-to-one' and 'one-to-many' are described in greater detail in FIGS. 5 and 6.

In one exemplary embodiment, the extension field can include a special use case of multi value fields (e.g., language dependent fields). In this business requirement, it may be required to maintain an additional description in different languages. To achieve this, a new extension node (e.g., 'additional description', one description for the colleague in Germany, one description for the colleague in India and the like) can be created with the relation multiplicity 'one-to-many' and with two extension fields (e.g., one for the language and one for the additional description). Further, the extension field for language behaves as a semantic key of the new extension node whereas the extension field for additional description field contains the actual extension field values specific to the client. Therefore, the extension data fields containing such special extension field values can be defined by the relation between the standard node instance key and the extension node instance key.

In one exemplary embodiment, an additional business data object associated with the business data object may be received. Storing the additional business data object can include separating the additional extension field value from the standard field value associated with the additional business data. Further, an extension node instance key associated with the additional extension field value is segregated. Furthermore, the extension field value is persisted in an associated extension field of the extension data persistence unit using the relation between the standard node instance key and the extension node instance key after converting the additional user-specific extension field value into the database format with the specific structure.

For example, the additional extension field value can include time spent for the hobbies per week. The hobbies and the time spent per week semantically belong together. Therefore, the hobbies and the time spent per week are grouped together and stored in one extension node. The semantic grouping is achieved by the relation between the standard node instance key and the extension node instance key, stored in the extension key persistence unit. Thereby making it easier for the client to understand the meaning of the extension fields. Further, no extra extension nodes need to be generated to all extension field values. In another exemplary embodiment, the semantic grouping can be done for the standard fields. For example, all header information of a sales order can be grouped together in one standard node.

In general, when the business data object is received, one entry is made in key tables (e.g., standard node instance key, the extension node instance key and the relation between the two are stored). Further, the associated data (e.g., standard field values and extension field values) are stored separately. In another exemplary embodiment, when additional business data object is received, extension field value associated with the additional business data object is stored in reference to the same key tables (e.g., standard node instance key, the extension node instance key and the relation between the two). In yet another exemplary embodiment, when the user customized data object is received with no data (e.g., standard field values and extension field values), then one entry is made in the key tables (e.g., standard node instance key, the extension node instance key and the relation between the two are persisted) with no data stored. Therefore, it can be easily distinguished between nodes (e.g., the extension field node and the standard field node) having data (e.g., initial values), additional data (e.g., non-initial values) and no data by persisting the keys (standard node instance key, the extension node instance key and the relation between the two) associated with the nodes (e.g., the extension field node and the standard field node).

Figure 4:
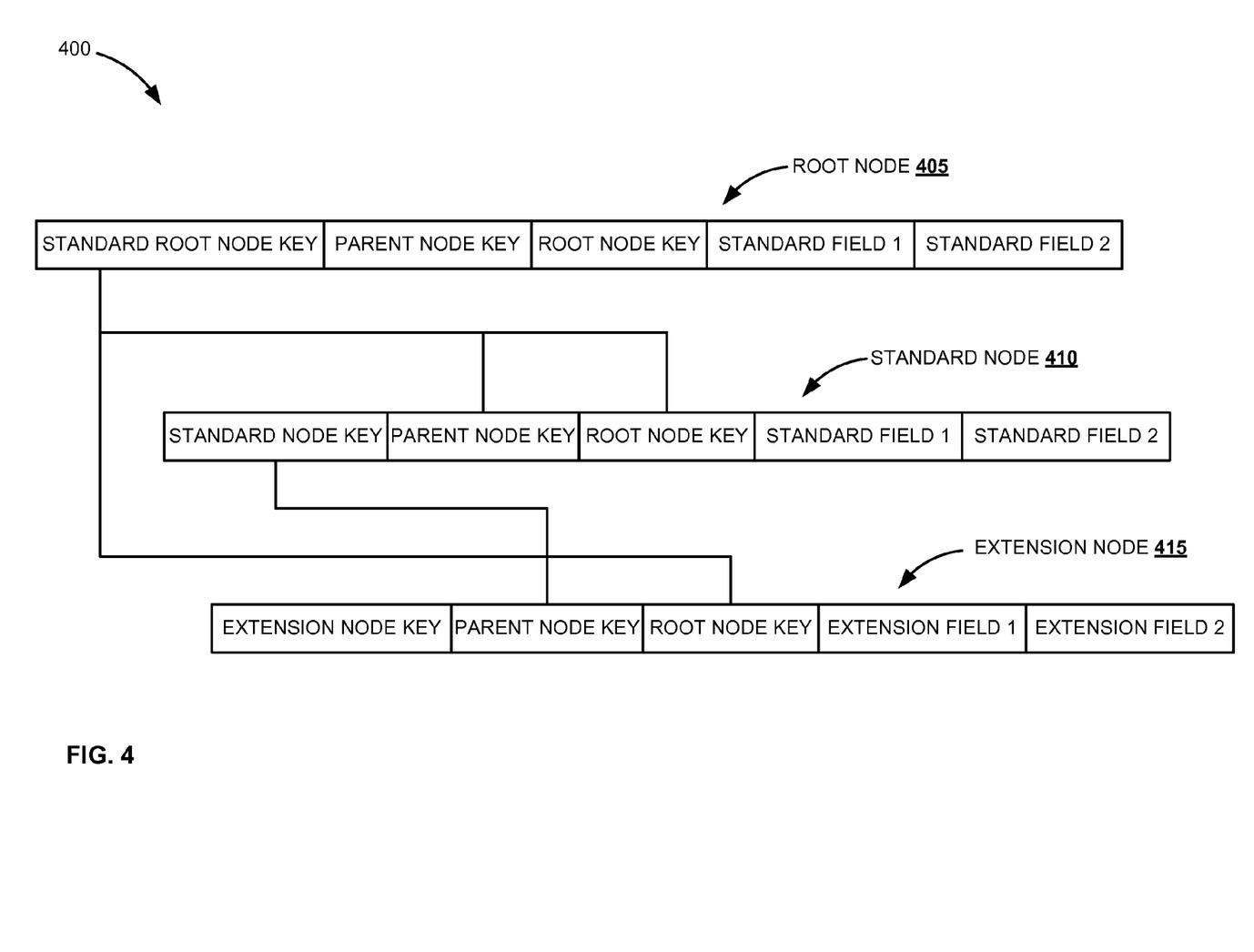
FIG. 4 shows a structure of a business data object, according to an embodiment.

FIG. 4 shows a structure of a business data object 400, according to an embodiment. The business data object 400 includes a root node 405, a standard node 410 and one or more extension nodes (e.g., an extension node 415). In one embodiment, the root node 405 includes a standard root node instance key and one or more standard field values. For example, the standard root node instance key includes a standard root node key, a parent node key and a root node key. The standard filed values can be standard field 1 and standard field 2 as shown in 405.

Further, the standard node 410 includes a standard node instance key and one or more standard field values. For example, the standard node instance key includes a standard node key, a parent node key and a root node key. The standard field values can be standard field 1 and standard field 2 as shown in 410. Furthermore, the extension node 415 includes an extension node instance key and one or more extension field values. For example, the extension node instance key includes an extension node key, a parent node key and a root node key. The extension field values can be extension field 1 and extension field 2 as shown in 415. In one exemplary embodiment, the root node key of the extension node 415 is connected to the standard root node key of the root node 405. Further, the parent node key of the extension node 415 is connected to the standard node key of the standard node 410. Furthermore, the root node key and the patent node key of the standard node are connected to the standard root node key of the root node 405. The connection of the node key, parent node key and the root node key describe the relation between the standard and extension nodes.

Figure 5:
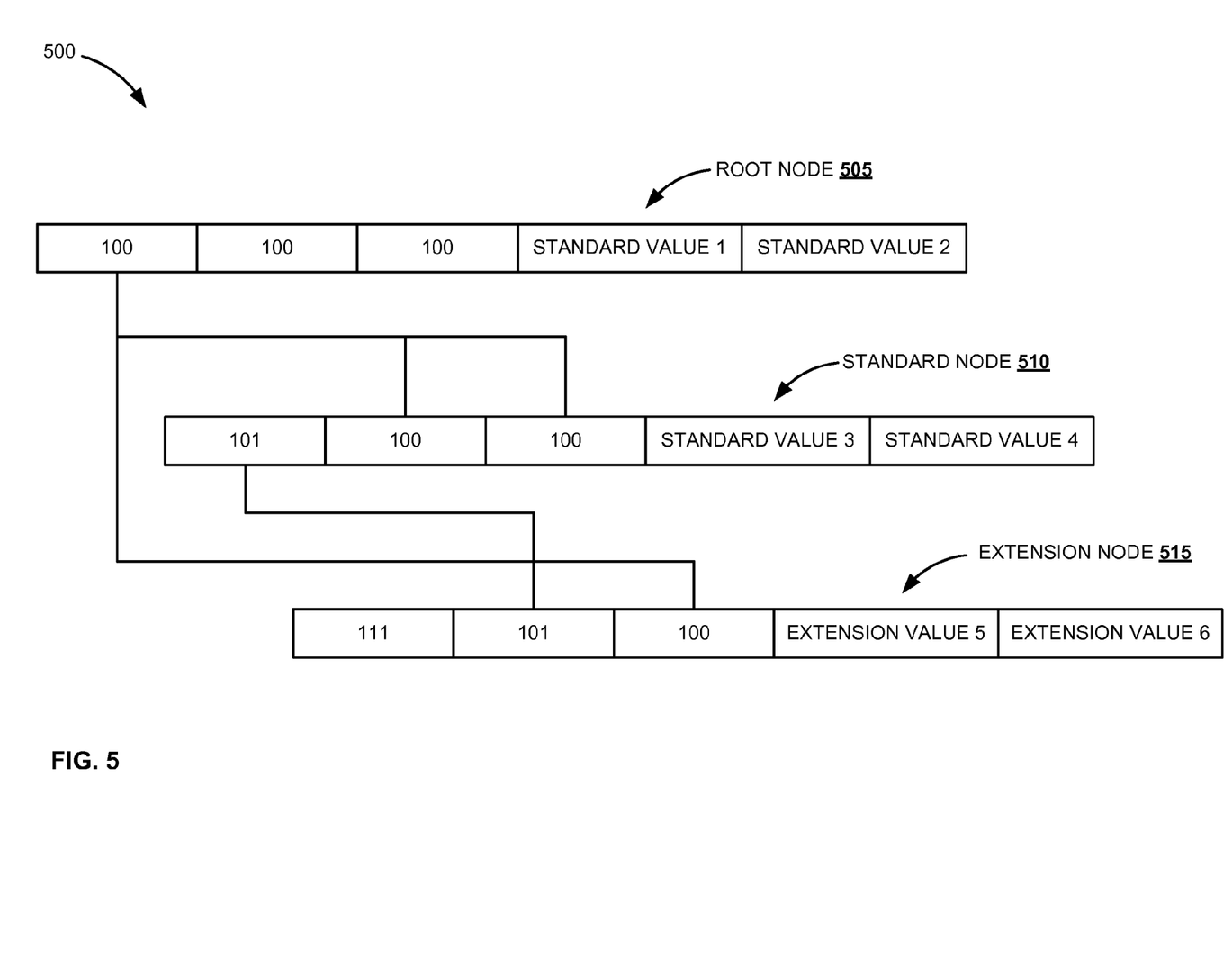
FIG. 5 shows a structure of an instance of a business data object node with a multiplicity 'one-to-one', according to an embodiment.

FIG. 5 shows a structure of an instance 500 of a business data object node with a multiplicity 'one-to-one', according to an embodiment. The business data object includes a root node 505, a standard node 510 and an extension node 515. In one exemplary embodiment, the instance 500 represents real time data at runtime with the multiplicity 'one-to-one' as one instance of the extension node 515 is associated with the standard node 510. The instance id represented by extension node key (e.g., 111) of the extension nodes 515. The root node key (e.g., 100) of the extension node 515 is connected to the standard root node key (e.g., 100) of the root node 505. Further, the parent node key (e.g., 101) of the extension node 515 is connected to the standard node key (e.g., 101) of the standard node 510. Furthermore, the parent node key (e.g., 100) and the root node key (e.g., 100) of the standard node 510 are connected to the standard root node key (e.g., 100) of the root node 505.

Figure 6:
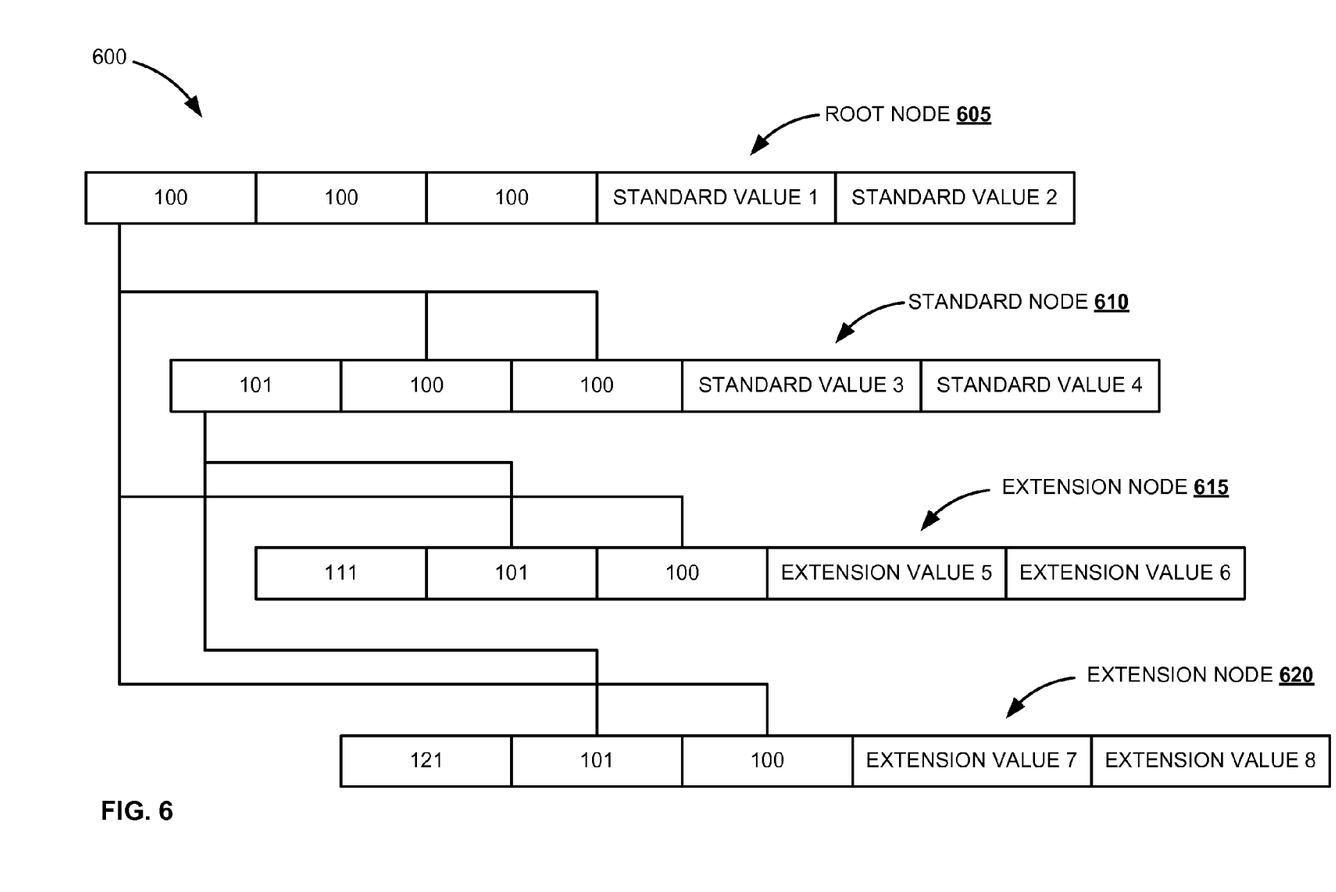
FIG. 6 shows a structure of an instance of a business data object node with a multiplicity 'one-to-many', according to an embodiment.

FIG. 6 shows a structure of an instance 600 of a business data object node with a multiplicity 'one-to-many', according to an embodiment. The business data object includes a root node 605, a standard node 610 and one extension node with two instances (e.g., 615 and 620). In one exemplary embodiment, the instance 600 represents real time data at runtime with the multiplicity 'one-to-many' as two instances of extension nodes (e.g., 615 and 620) are associated with the standard node 610. The two instances are represented by extension node keys (e.g., 111 and 121) of the extension nodes (e.g., 615 and 620). The root node key (e.g., 100) of the extension node instances (e.g., 615 and 620) are connected to the same standard root node key (e.g., 100) of the root node 605. Further, the parent node key (e.g., 101) of the extension node instances (e.g., 615 and 620) is connected to the same standard node key (e.g., 101) of the standard node 610. The one-to-many multiplicity is achieved as there are two extension node instances (e.g., 615 and 620) with the same parent node key. In general, if there are multiple extension node instances having the same parent key, the 'one-to-many' multiplicity can be achieved. Furthermore, the parent node key (e.g., 100) and the root node key (e.g., 100) of the standard node 610 are connected to the standard root node key (e.g., 100) of the root node 505.

Figure 7:
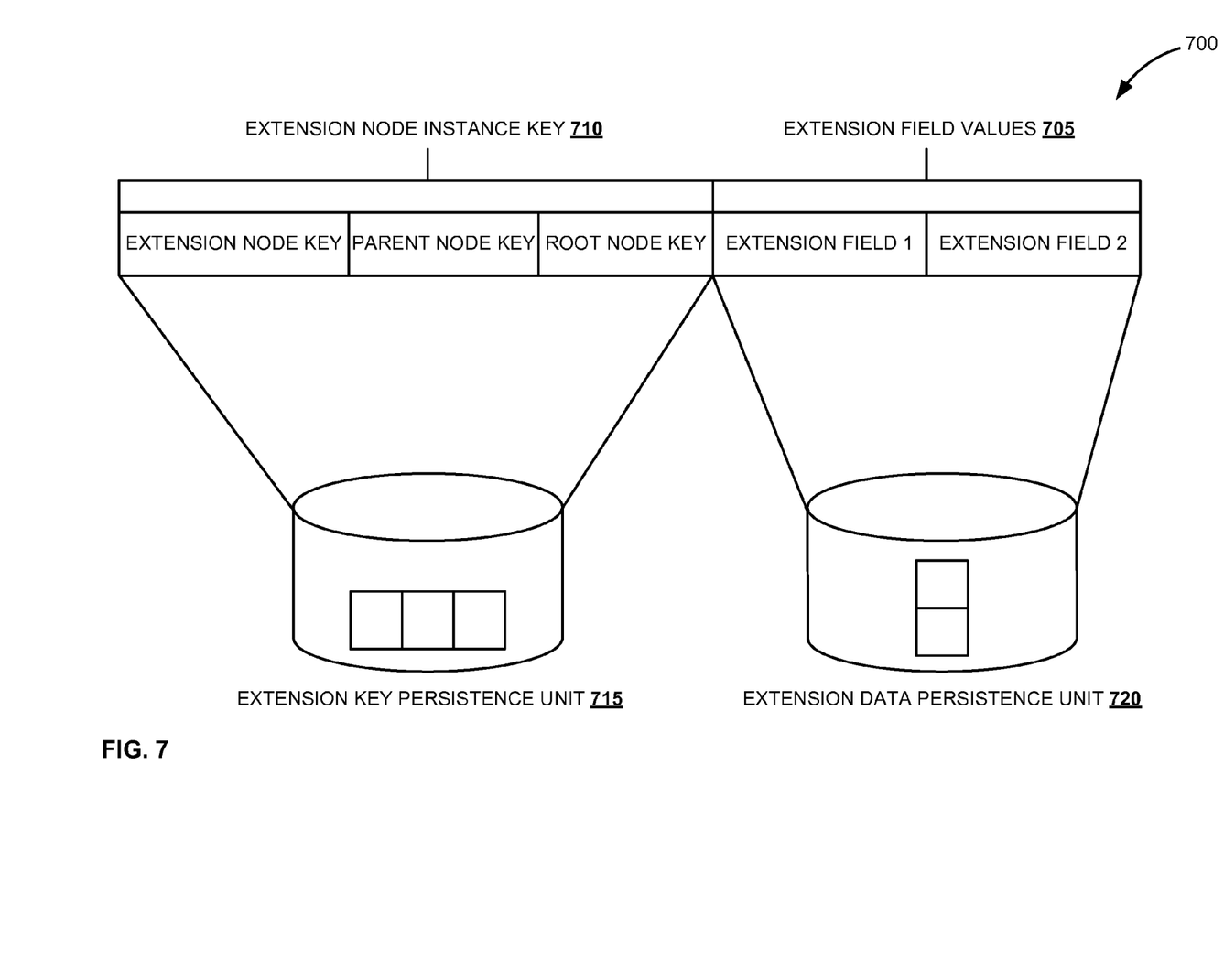
FIG. 7 is a block diagram illustrating a structure of an extension field value, according to an embodiment.

FIG. 7 shows a structure of an extension field value 700, according to an embodiment. The extension field value 700 can include one or more extension field values 705 and the associated extension node instance key 710. In one embodiment, the extension node instance key 710 includes an extension node key (e.g., extension node ID sales order_100), the parent node key (e.g., a relation between a standard node and an extension node) and the root node key (e.g., a root node ID header of a sales order). Further, the extension field values 705 can be associated with one or more extension fields (e.g., extension field 1 and extension field 2). Furthermore, the extension node instance key 710 is stored in an extension key persistence unit 715 (e.g., in a row). And, the extension field values 705 are stored in an extension data persistence unit 720 (e.g., in one or more columns). Retrieving the extension field value 700 specific to a client for user by the client is described in greater detail in FIGS. 8, 9A and 9B.

Figure 8:
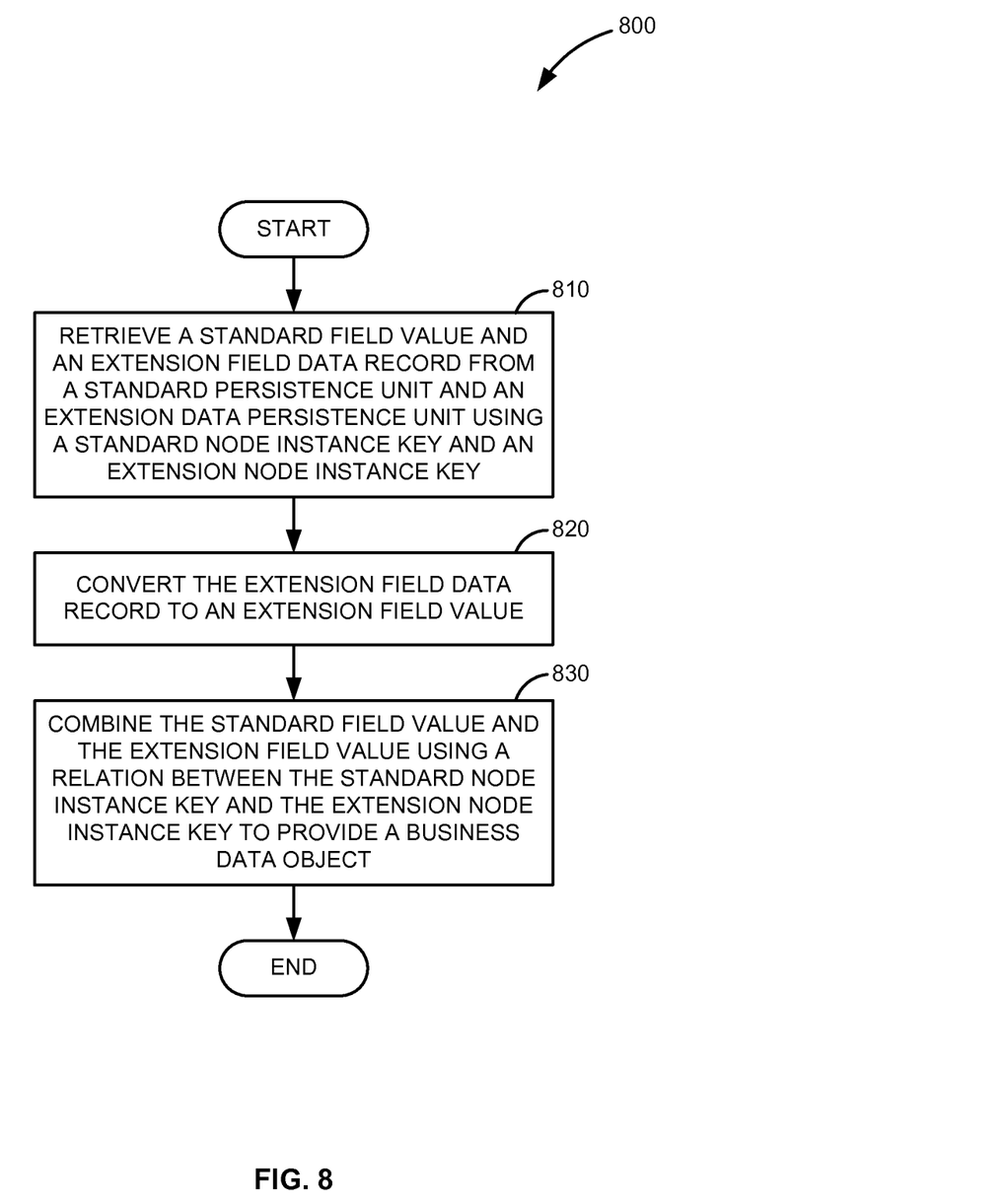
FIG. 8 is a flow diagram illustrating a method to provide a business data object specific to a client, according to an embodiment.

FIG. 8 is a flow diagram illustrating a method to provide a business data object, according to an embodiment. At step 810, a standard field value and an extension field data record are retrieved from the standard persistence unit and the extension data persistence unit using a standard node instance key and an extension node instance key. For example, items (e.g., the extension field value) associated with a sales order (e.g., standard field value) are retrieved using the associated standard node instance key and the extension node instance key. In one embodiment, the standard field value and the extension field data record are retrieved at a faster pace using the standard node instance key and the extension node instance key, which is explained in greater detail in FIG. 9.

At step 820, the extension field data record is converted to the extension field value in a format specific to the client system. For example, the format of the received items may not be compatible to the format of the client system. Therefore, the format of the received items is converted to the format compatible to the client system. At step 830, the standard field value and the extension field value are combined using the relation between the standard node instance key and the extension node instance key to provide the business data object. For example, the items associated with the sales order is combined using the stored relation (e.g., the sales order includes 100 items specific to the client). Therefore, the business data object can be provided for use by the client with a networked application.

Figure 9A:
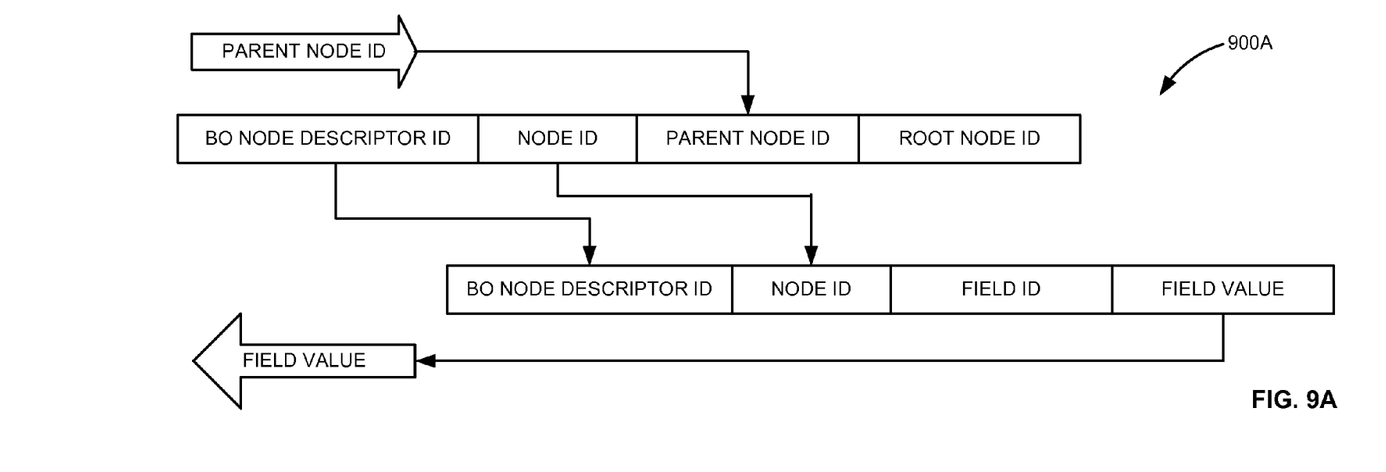
FIGS. 9A and 9B are block diagrams illustrating fast navigation to an extension field value, according to an embodiment.
Figure 9B:
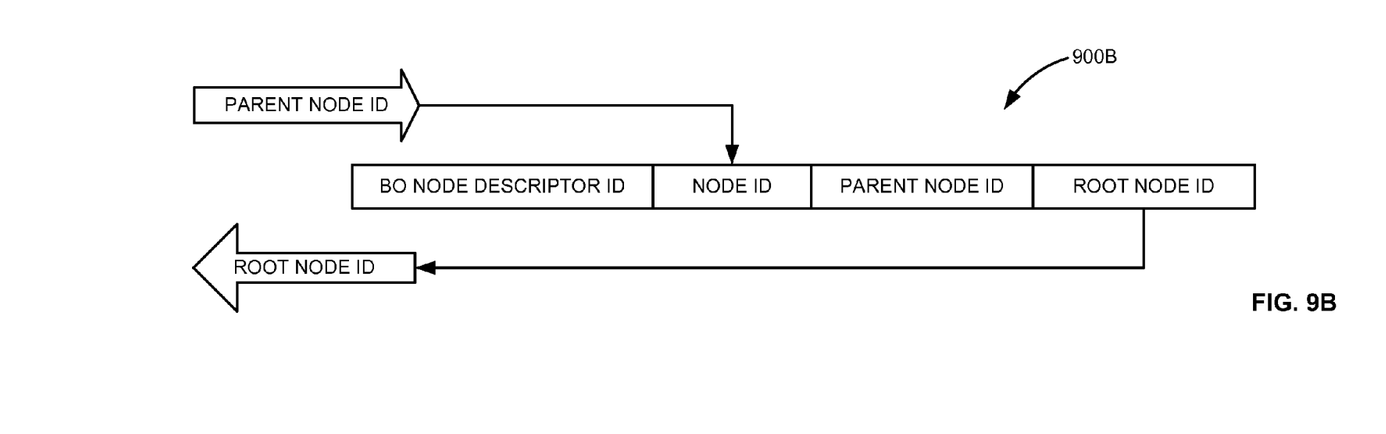

FIGS. 9A and 9B are block diagrams (900A and 900B) illustrating fast navigation to an extension field value, according to an embodiment. The fast navigation to the extension field value can be achieved using standard node instance key (e.g., BO node descriptor ID) and an extension node instance key (node ID, parent node ID and root node ID). FIG. 9A illustrates retrieving of an extension field value (e.g., field value) using the parent node ID (e.g., parent key of the extension node instance key). FIG. 9B illustrates fast navigation of the extension field value using the root node ID.

In one exemplary embodiment, the parent node ID is used to retrieve the extension field value. The parent node ID defines a relation between a standard node (e.g., BO node descriptor ID) and an extension node (e.g., node ID). Therefore, the extension field values corresponding to the BO node descriptor ID and the node ID is retrieved using the parent node ID as illustrated in FIG. 9A.

In another exemplary embodiment, the root node ID is used to enable a fast navigation to the root node instance (e.g. the header of a particular sales order). The extension key persistence unit contains the root node ID. Further, the root node ID is read from the extension key persistence unit via the extension node ID as illustrated in FIG. 9B For example, consider the storage of three sales order (e.g., sales order 120, 130 and 200). Further, the sales orders (e.g., sales order 120, 130 and 200) can have different identifiers, which are ordered by the client. Therefore, using the root ID, the items associated with the respective sales order can be retrieved (e.g., items associated with the sales order 120 can be retrieved).

In general, the above described method is advantageous as the method provides client data isolation, ensures that the business data objects of the clients are treated in a homogeneous way while providing a seamless work environment to a client such that the client's business data objects are viewable as though they are stored in a customized database table. Further, the data of extension fields are no longer added to the standard database tables and no new tables are generated per node. Instead all extension field data is stored in a generic data persistence unit. Also, the client can develop add-ons specific to the client to support specific business process without making any changes to the standard data persistence unit. Furthermore, a new extension key persistence is introduced which stores the keys and the relations between the nodes. This makes it possible for the client to semantically group extension fields together, define extension fields which can carry multiple values and also define extension fields which can carry language dependent descriptions.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 10:
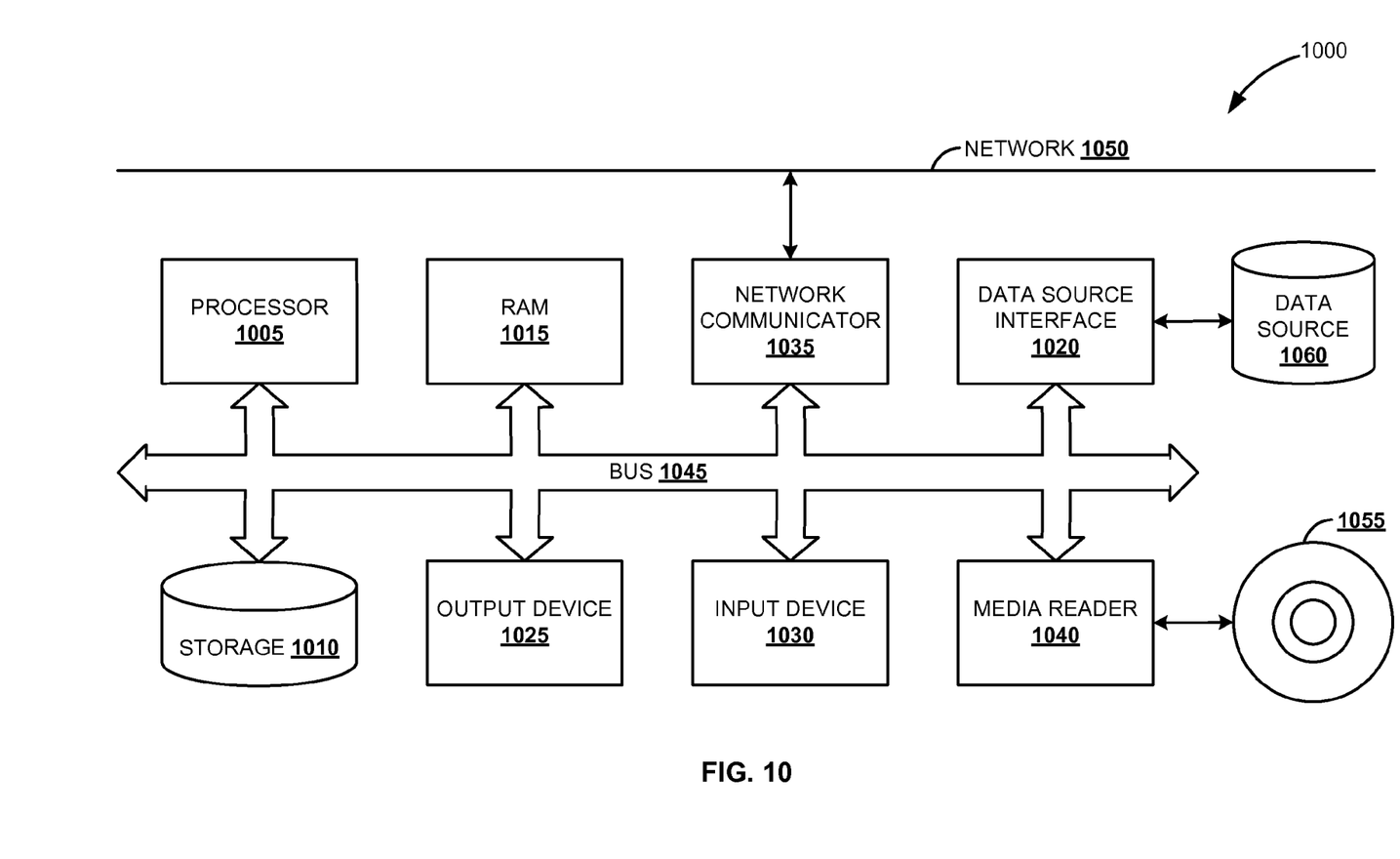
FIG. 10 is a block diagram illustrating a computing environment in which the techniques described to provide multi-client generic persistence for extension nodes, according to an embodiment.

FIG. 10 is a block diagram of an exemplary computer system 1000. The computer system 1000 includes a processor 1005 that executes software instructions or code stored on a computer readable storage medium 1055 to perform the above-illustrated methods of the invention. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment of the invention, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a tangible computer readable storage medium to physically store instructions, which when executed by a computer, cause the computer to:
   receive a business data object, the business data object including standard field values and extension field values specific to a client;
   separate the standard field values and the extension field values of the business data object;
   segregate an extension node instance key associated with the extension field values, wherein the extension node instance key comprises a parent node key defining extension fields carrying multiple extension field values;
   store the standard field values and an associated standard node instance key in a standard node of a standard data persistence unit, and the extension field values in an extension node of an extension data persistence unit for semantically grouping the extension fields of the extension node specific to the client, wherein the standard node instance key defines a number of instances of extension nodes associated with the standard node corresponding to the standard field values;
   store the extension node instance key, and a relation between the standard node instance key and the extension node instance key in an extension key persistence unit defining the extension node specific to the client in a multi-client system; and
   provide the business data object by combining the standard field values stored in the standard data persistence unit and the extension field values stored in the extension data persistence unit using the extension node instance key and the relation between the standard node instance key and the extension node instance key stored in the extension key persistence unit upon receiving a request to retrieve the business data object.

2. A computer implemented method to provide multi-client generic persistence for extension nodes defining an extension node specific to a client in a multi-client system, the computer implemented method comprising:
   receiving a business data object, the business data object including standard field values and extension field values specific to the client;
   separating the standard field values and the extension field values of the business data object;
   segregating an extension node instance key associated with the extension field values, wherein the extension node instance key comprises a parent node key defining extension fields carrying multiple extension field values;
   storing the standard field values and an associated standard node instance key in a standard node of a standard data persistence unit, and the extension field values in the extension node of an extension data persistence unit for semantically grouping the extension fields of the extension node specific to the client, wherein the standard node instance key defines a number of instances of extension nodes associated with the standard node corresponding to the standard field values;
   storing the extension node instance key, and a relation between the standard node instance key and the extension node instance key in an extension key persistence unit defining the extension node specific to the client in the multi-client system; and
   providing the business data object by combining the standard field values stored in the standard data persistence unit and the extension field values stored in the extension data persistence unit using the extension node instance key and the relation between the standard node instance key and the extension node instance key stored in the extension key persistence unit upon receiving a request to retrieve the business data object.

3. A computer system to provide multi-client generic database for extension nodes defining an extension node specific to a client in a multi-client system, the computer system comprising:
at least one processor; and
one or more memory devices communicative with the processor, wherein the one or more memory devices includes:
an extension framework including instructions to
receive a business data object, the business data object including standard field values and extension field values specific to the client;
separate the standard field values and the extension field values of the business data object; and
segregate an extension node instance key associated with the extension field values, wherein the extension node instance key comprises a parent node key defining extension fields carrying multiple extension field values;
an extension field persistence adapter communicative with the extension framework includes instructions to convert the extension field values into a database format having a specific structure;
a standard data persistence unit communicative with the extension framework to store the standard field values and associated standard node instance key, wherein the standard node instance key defines a number of instances of extension nodes associated with the standard node corresponding to the standard field values;
an extension data persistence unit communicative with the extension field persistence adapter to store the converted extension field values for semantically grouping the extension fields of the extension node specific to the client; and
an extension key persistence unit communicative with the extension field persistence adapter to store the extension node instance key and a relation between the standard node instance key and the extension node instance key, wherein the extension node instance key and the relation between the standard node instance key and the extension node instance key is used to provide the business data object by combining the standard field values and the extension field values upon receiving a request to retrieve the business data object.

4. The article of manufacture of claim 1, wherein the standard field values correspond to one or more standard fields of the standard node associated with a standard data object defined by a networked application and the extension field values correspond to the extension fields of the extension node to modify operation of the networked application for the client in the multi-client system.

5. The article of manufacture of claim 1, wherein the extension node instance key further comprises an extension node key and a root node key.

6. The article of manufacture of claim 1, wherein storing the extension field values in the extension persistence unit comprises converting the extension field values into a database format having a specific structure.

7. The article of manufacture of claim 1, wherein providing the business object comprises:
retrieving the standard field values and an extension field data record from the standard persistence unit and the extension data persistence unit using the standard node instance key and the extension node instance key;
converting the extension field data record to the extension field values; and
combining the standard field values and the extension field values using the relation between the standard node instance key and the extension node instance key to provide the business data object.

8. The article of manufacture of claim 1, wherein the business data object comprises an additional extension field value specific to the client, and the article of manufacture further comprising instructions, which when executed by the computer, cause the computer to:
separate the additional extension field value from the standard field values;
segregate an extension node instance key associated with the additional extension field value;
convert the additional extension field value into the database format with the specific structure; and
persist the converted extension field value in an extension field associated with the extension node of the extension data persistence unit using the relation between the standard node instance key and the extension node instance key stored in the extension key persistence unit.

9. The computer implemented method of claim 2, wherein the standard field values correspond to one or more standard fields of the standard node associated with a standard data object defined by a networked application and the extension field values correspond to the extension fields of the extension node to modify operation of the networked application for the client in the multi-client system.

10. The computer implemented method of claim 2, wherein the extension node instance key further comprises an extension node key and a root node key.

11. The computer implemented method of claim 2, wherein storing the extension field values in the extension persistence unit comprises converting the extension field values into a database format having a specific structure.

12. The computer implemented method of claim 2, wherein providing the business data object comprises:
retrieving the standard field values and an extension field data record from the standard persistence unit and the extension data persistence unit using the standard node instance key and the extension node instance key;
converting the extension field data record to the extension field values; and
combining the standard field values and the extension field values using the relation between the standard node instance key and the extension node instance key to provide the business data object.

13. The computer implemented method of claim 2, wherein the business data object comprises an additional extension field value specific to the client, the computer method further comprises:
separating the additional extension field value from the standard field values;
segregating an extension node instance key associated with the additional extension field value;
converting the additional extension field value into the database format with the specific structure; and
storing the converted extension field value in an extension field associated with the extension node of the extension data persistence unit using the relation between the standard node instance key and the extension node instance key stored in the extension key persistence unit.

14. The computer system of claim 3, wherein providing the business data object for use by the client with a networked application, comprises:
- retrieving the standard field values and an extension field data record from the standard persistence unit and the generic extension data persistence unit using the standard node instance key and the extension node instance key;
- converting the extension field data record to the extension field values; and
- combining the standard field values and the extension field values using the relation between the standard node instance key and the extension node instance key to provide the user-customized data object.

15. The article of manufacture of claim 5, wherein the extension node key comprises an extension node ID corresponding to the extension field values and the root node key comprises a root node ID corresponding to the extension field values.

16. The article of manufacture of claim 8, wherein the extension field of the extension node comprises the extension field values and the additional extension field value specific to the client.

17. The computer implemented method of claim 10, wherein the extension node key comprises an extension node ID corresponding to the extension field values and the root node key comprises a root node ID corresponding to the extension field values.

18. The computer implemented method of claim 13, wherein the extension field of the extension node comprises the extension field values and the additional extension field value specific to the client.

\* \* \* \* \*